Sept. 22, 1925.
L. W. THOMPSON
1,554,667
REGULATING SYSTEM
Filed April 21, 1924
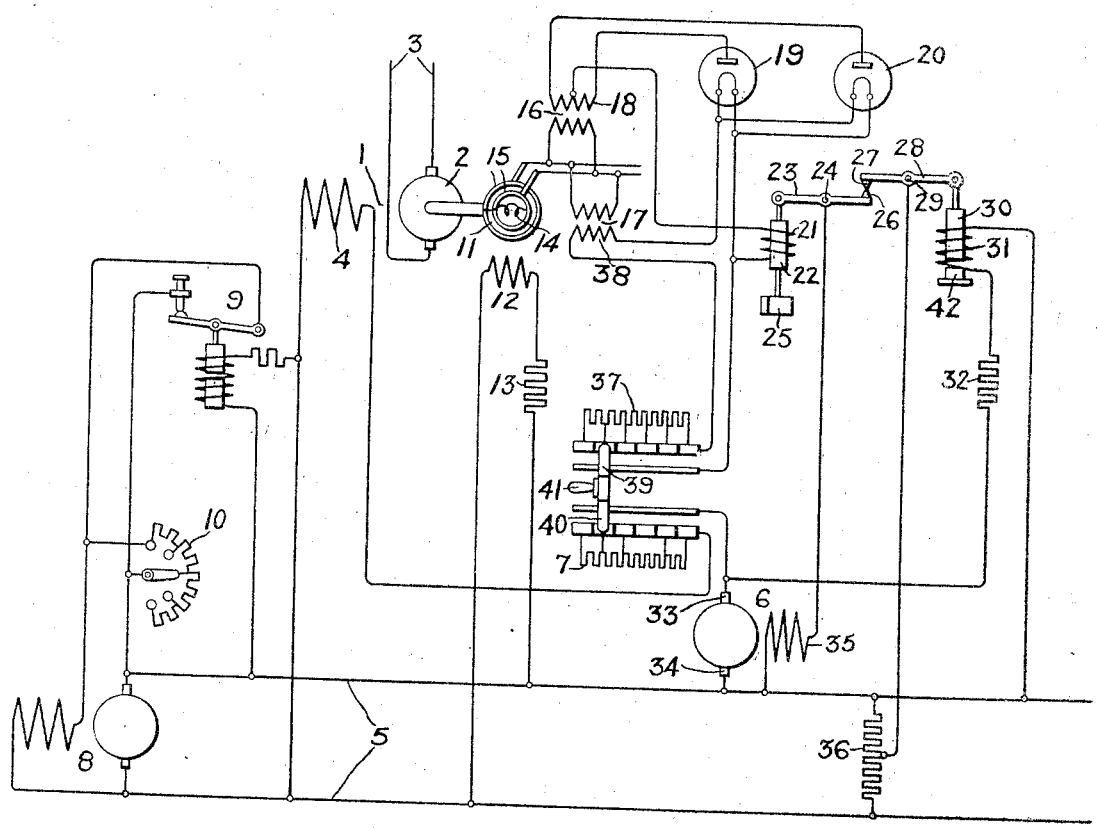
Inventor:
Louis W. Thompson
by Alexander S. ...
His Attorney Patented Sept. 22, 1925.

1,554,667

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

REGULATING SYSTEM.

Application filed April 21, 1924. Serial No. 707,849.

*To all whom it may concern:*

Be it known that I, LOUIS W. THOMPSON, a citizen of the United States, residing at Schenectady, in the county of Schenectady, State of New York, have invented certain new and useful Improvements in Regulating Systems, of which the following is a specification.

My invention relates to regulating systems, and has for its object the provision of an improved regulating system which is capable of maintaining the speed of a dynamo electric machine within very narrow limits without the production of objectionable hunting.

In Letters Patent No. 1,365,566, January 11, 1921, I have disclosed and claimed a regulating system in which a dynamo electric machine is arranged to produce a counter-electromotive force in a circuit for the purpose of regulating the current in such circuit or an associated circuit. In accordance with my present invention, the value of the electromotive force generated by such a counter-electromotive force machine connected in the field circuit of a main machine is regulated through amplifying means comprising an electron discharge device operable in accordance with variation in the speed of the main machine, and anti-hunting means responsive to an electrical condition of the counter-electromotive force machine are arranged to cooperate with the amplifying means to prevent pulsations in the main machine field current.

My invention will be better understood on reference to the following description when considered in connection with the accompanying drawing which shows diagrammatically an embodiment of the invention and its scope will be pointed out in the appended claims.

The drawing shows a main load motor 1 having its armature winding 2 adapted to be supplied with current through leads 3 and its field winding 4 arranged to be supplied with current from the direct current bus 5. A counter-electromotive force machine 6 and an adjustable resistor 7 are connected in series with the field winding 4 to the bus 5 which is operatively associated with a source of direct current shown as a generator 8. This generator is arranged to have its field current regulated by a regulator 9 which operates in a well known manner periodically to short circuit the resistor 10.

An alternating current generator 11, comprising a field winding 12 connected to the bus 5 through a resistor 13, and an armature winding 14 connected between the slip rings 15, is provided for producing a voltage of a value proportional to the speed of the load motor 1. Transformers 16 and 17 are connected to the armature terminals of the generator 11. Operatively associated with the secondary winding 18 of the transformer 16 are two electron discharge devices or vacuum tubes 19 and 20 through which current from the transformer 16 is rectified and supplied to the coil 21 in a manner well understood by those skilled in the art. It will be observed that the value of the rectified current supplied to the coil 21 is dependent both on the secondary voltage of the transformer 16 and upon the filament temperature of the tubes 19 and 20. In accordance with my invention, the transformer 17 is provided for controlling the temperature of the tube filaments in accordance with the speed of the motor 1. With this arrangement, it is therefore possible to amplify the effect of slight variations in the main motor speed to change the current supplied from the tubes and to utilize this amplified current to energize the coil 21 by which the core 22 is raised and the member 23 is rocked about the pivot 24. A dash pot 25 may be provided for the purpose of damping the movement of the plunger 22. The vibratory member 23 is provided at its right hand end with a movable contact 26 which is adapted to cooperate with a like contact 27 mounted on the left hand end of a vibratory member 28 arranged to rock about the pivot 29. Operatively associated with the vibratory member 28 is a plunger 30 and a coil 31 connected through the resistor 32 to the brushes 33 and 34 of the counter-electromotive force machine 6. As hereinafter explained, the member 28, coil 31 and plunger 30 operate as an anti-hunting device to prevent hunting between the machines 1 and 6. The field winding 35 of the machine 6 is arranged to be connected to the bus 5 through movable contacts 26 and 27 and a potentiometer or resistor 36 connected between the bus lines 5.

As previously indicated, the value of the rectified current supplied from the transformer 16 to the coil 21 through the tubes 19 and 20 is dependent both on the secondary voltage of the transformer 16 and the temperature at which the tube filaments are operated. An adjustable resistor 37 is connected to the secondary winding 38 of the transformer 17 in series with the tube filaments for controlling the value of the rectified current. Insulated contact members 39 and 40, operable in response to movement of a handle 41, are provided to facilitate simultaneous adjustment of the rheostats 7 and 37. With this arrangement, a more or less constant relation is maintained between the sensitivity of the coil 21 to changes in the speed of the machine 1 and that of the field coil 4 of this machine to changes in the voltage of the counter-electromotive force machine 6. The resistors 13 and 32 are provided for rendering the coils 12 and 31 respectively less sensitive to changes in the voltage of the bus 5. An adjustable fixed core 42 may be provided to cooperate with the plunger 30 of coil 31 in a manner well known in the art.

With the machines 6 and 8 operating and connected as shown, the main machine 1 may be accelerated from rest by supplying current to its armature winding through the leads 3. So long as the speed of the machine 1 is below normal, the current supplied to the coil 21 is comparatively low and the movable contacts 26 and 27 are maintained in engagement with each other, thereby closing the field circuit of the machine 6 and enabling it to develop a counter-electromotive force by which the excitation of the machine 1 is kept sufficiently low to permit its acceleration. If the normal speed of the machine 1 is exceeded, the current traversing the coil 21 is increased and the contacts 26 and 27 are separated, thereby interrupting the field of the machine 6 and permitting an increase in the excitation of the main machine 1 which will thereupon decelerate to normal speed. The effect of variations in the speed of the machine 1 on the coil 21 are thus amplified by means of the transformer 16 and tubes 19 and 20, and regulation of the excitation of the machine 1 is rendered extremely sensitive to variations in its speed. This speed is therefore maintained within very narrow limits.

To prevent hunting between the machines 1 and 6, the anti-hunting device comprising the vibratory member 28, the plunger 30 and the coil 31 is provided. This device is operable in response to increase in the voltage of the machine 6 and acts to accelerate deenergization of the field coil 35. In this manner, decrease in the current of the coil 4 is arrested before it reaches an abnormally low value and periodic interchanges of power between the machines 1 and 6 are largely avoided.

I have explained my invention by illustrating and describing a certain specific embodiment thereof, but it will be readily understood that it may be embodied in other forms than that shown and described. I accordingly, do not wish to be restricted to the particular amplifying means shown, nor to its combination with the precise anti-hunting device illustrated. The terms of the appended claims are, therefore, not restricted to the exact structure disclosed, but are intended to cover all changes and modifications within the spirit and scope of my invention.

What I claim as new and desire to secure by Letters Patent of the United States, is:

1. In a system for regulating the speed of an electric motor, the combination of a dynamo electric machine for producing a counter-electromotive force to control the excitation of said motor, amplifying means responsive to the speed of said motor, and a vibratory device arranged to be controlled by said amplifying means for varying the excitation of said machine.

2. In a system for regulating the speed of an electric motor, the combination of a dynamo electric machine for producing a counter-electromotive force to control the excitation of said motor, an alternating current generator arranged to be driven at a speed proportional to the speed of said motor, means for rectifying the current supplied from said generator, and a vibratory device arranged to be controlled by said rectified current for varying the excitation of said machine.

3. In a system for regulating the speed of an electric motor, the combination of a dynamo electric machine for producing a counter-electromotive force to control the excitation of said motor, an alternating current generator arranged to be driven at a speed proportional to the speed of said motor, a step-up transformer adapted to be supplied with current from said generator, a vacuum tube for rectifying the current supplied from said transformer, means for controlling the filament temperature of said tube in accordance with the resistance drop in the field circuit of said motor, and vibratory means arranged to be controlled by said rectified current for varying the excitation of said machine.

4. In a system for regulating the speed of an electric motor, the combination of a dynamo electric machine for producing a counter-electromotive force to control the excitation of said motor, amplifying means responsive to an electrical condition of said motor, anti-hunting means arranged to cooperate with said amplifying means for preventing hunting between said motor and said machine, and a vibratory device arranged to be controlled by said said amplifying means for varying the excitation of said machine.

5. In a system for regulating the speed of an electric motor, the combination of a dynamo electric machine for producing a counter-electromotive force to control the excitation of said motor, amplifying means responsive to an electrical condition of said motor, a vibratory device arranged to be controlled by said amplifying means for varying the excitation of said machine, and a second vibratory device operable in response to an electrical condition of said machine and arranged to cooperate with said first mentioned vibratory means to prevent hunting between said motor and said machine.

In witness whereof, I have hereunto set my hand this 19th day of April, 1924.

LOUIS W. THOMPSON.